US010600280B2

(12) United States Patent
Akita (10) Patent No.: US 10,600,280 B2
(45) Date of Patent: Mar. 24, 2020

(54) GAMING MACHINE, SYSTEM, AND METHOD FOR AN ASSOCIATED STAGE EFFECT

(71) Applicant: Konami Gaming, Incorporated, Las Vegas, NV (US)

(72) Inventor: Takashi Akita, Zama (JP)

(73) Assignee: Konami Gaming, Incorporated, Las Vegas, NV (US)

(*) Notice: Subject to any disclaimer, the term of this patent is extended or adjusted under 35 U.S.C. 154(b) by 0 days.

(21) Appl. No.: 15/178,191

(22) Filed: Jun. 9, 2016

(65) Prior Publication Data

US 2017/0358171 A1 Dec. 14, 2017

(51) Int. Cl.
| | |
|---|---|
| *A63F 13/00* | (2014.01) |
| *G07F 17/32* | (2006.01) |
| *H04L 12/26* | (2006.01) |
| *H04L 29/06* | (2006.01) |
| *A63F 13/31* | (2014.01) |
| *G07F 17/34* | (2006.01) |

(52) U.S. Cl.
CPC .......... *G07F 17/3225* (2013.01); *A63F 13/31* (2014.09); *G07F 17/3213* (2013.01); *G07F 17/3223* (2013.01); *G07F 17/3269* (2013.01); *G07F 17/34* (2013.01); *H04L 43/10* (2013.01); *H04L 69/28* (2013.01)

(58) Field of Classification Search
CPC .. G07F 17/3286; G07F 17/34; G07F 17/3213; G07F 17/3216; G07F 17/3227; G07F 9/023; G07F 17/3211; A63F 2300/634; G06F 17/30575; H04L 43/10
See application file for complete search history.

(56) References Cited

U.S. PATENT DOCUMENTS

| | | | |
|---|---|---|---|
| 5,012,468 A * | 4/1991 | Siegel | ................ H04L 12/4035 370/454 |
| 8,912,727 B1 | 12/2014 | Brunell et al. | |
| 2002/0160826 A1 | 10/2002 | Gomez et al. | |
| 2002/0187826 A1 | 12/2002 | Seymour et al. | |

(Continued)

FOREIGN PATENT DOCUMENTS

WO 2017/213821 A1 12/2017

OTHER PUBLICATIONS

"Ring network", Nov. 30, 2015, Wikipedia, <https://en.wikipedia.org/w/index.php?title=Ring_network&oldid=693042443>.*

(Continued)

*Primary Examiner* — Justin L Myhr
(74) *Attorney, Agent, or Firm* — Howard & Howard Attorneys PLLC (57) ABSTRACT

A gaming system comprises a plurality of gaming machines operably interconnected. Each of the plurality of gaming machines is assigned a unique machine identification code. Each of the plurality of gaming machines includes a stage effect controller configured to perform a predetermined stage effect, a common timer for providing timing information related to the performance of the predetermined stage effect to each of the plurality of gaming machines, and a control unit operably coupled to the stage effect controller and being configured to perform the predetermined stage effect based on the timing information and the machine identification code.

20 Claims, 12 Drawing Sheets

(56) References Cited

U.S. PATENT DOCUMENTS

| | | | | |
|---|---|---|---|---|
| 2005/0221897 | A1* | 10/2005 | Oe | A63F 13/12 |
| | | | | 463/42 |
| 2008/0303746 | A1* | 12/2008 | Schlottmann | G07F 17/32 |
| | | | | 345/1.2 |
| 2010/0234090 | A1* | 9/2010 | Thomas | G07F 17/32 |
| | | | | 463/20 |
| 2012/0178523 | A1* | 7/2012 | Greenberg | G07F 17/3211 |
| | | | | 463/25 |
| 2013/0184078 | A1* | 7/2013 | Brunell | G07F 17/3202 |
| | | | | 463/40 |
| 2014/0073430 | A1 | 3/2014 | Brunell et al. | |
| 2014/0335956 | A1 | 11/2014 | Brunell et al. | |
| 2015/0172843 | A1* | 6/2015 | Quan | G06F 3/162 |
| | | | | 381/18 |
| 2015/0262455 | A1 | 9/2015 | Radek et al. | |

OTHER PUBLICATIONS

International Search Report and Written Opinion of the International Searching Authority (International Application No. PCT/US2017/033471); dated Aug. 14, 2017; 9 pages.

International Preliminary Report on Patentability (International Application No. PCT/US2017/033471); dated Dec. 20, 2018; 7 pages.

Examination Report No. 1 (AU Application No. 2017278688); dated Feb. 20, 2019; 4 pages.

* cited by examiner

GAMING MACHINE, SYSTEM, AND METHOD FOR AN ASSOCIATED STAGE EFFECT

TECHNICAL FIELD

The present invention relates to a gaming machine, a system comprising a series of gaming machines, and a method to associate a stage effect among the series of gaming machines.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

SUMMARY OF INVENTION

In one aspect of the present invention, a gaming system is provided. A gaming system comprises a plurality of gaming machines operably interconnected. Each of the plurality of gaming machines is assigned a unique machine identification code. Each of the plurality of gaming machines includes a stage effect controller configured to perform a predetermined stage effect, a common timer for providing timing information related to the performance of the predetermined stage effect to each of the plurality of gaming machines, and a control unit operably coupled to the stage effect controller and being configured to perform the predetermined stage effect based on the timing information and the machine identification code.

In another aspect of the invention, a method to associate a stage effect among a series of operably interconnected gaming machines is disclosed. In a first step, each of the plurality of gaming machines is assigned a unique machine identification code. In a second step, a common timer of each of the plurality of gaming machines provides timing information related to a performance of a predetermined stage effect by a stage effect controller of each of the plurality of gaming machines. In a third step, a control unit of each of the plurality of gaming machines performs the predetermined stage effect based on the timing information and the machine identification code.

DETAILED DESCRIPTION OF EMBODIMENTS

With reference to the drawings, and in operation, the present invention is directed towards a gaming machine, a system comprising a series of gaming machines, and a method to associate a stage effect among the series of gaming machines. The series of gaming machines can perform associated stage effects. Stage effects may include LED illumination (including color balance and brightness of each RGB LED module, etc.), video graphic, sound, mechanical reel spin and any combination thereof. Associated stage effects may involve two or more gaming machines, all gaming machines in a bank of gaming machines or all gaming machines in an area of a gaming property. An associated stage effect may include a stage effect that is synchronized across multiple machines, such as all machines providing the same stage effect simultaneously or sequentially. For example, one or more bright spot may be moved across LED illuminations of adjacently located machines.

Alternatively, some machines in a group may provide the same stage effect simultaneously or sequentially, while other machines in the same group do not. In yet another embodiment, machines may provide a specific stage effect based on an associated machine ID. Because an illumination is easier to display visually herein, an illumination effect will be used as an exemplary stage effect throughout this detailed description, although it will be understood that any type of stage effect known in the art may be used with the present invention.

Figure 1A:
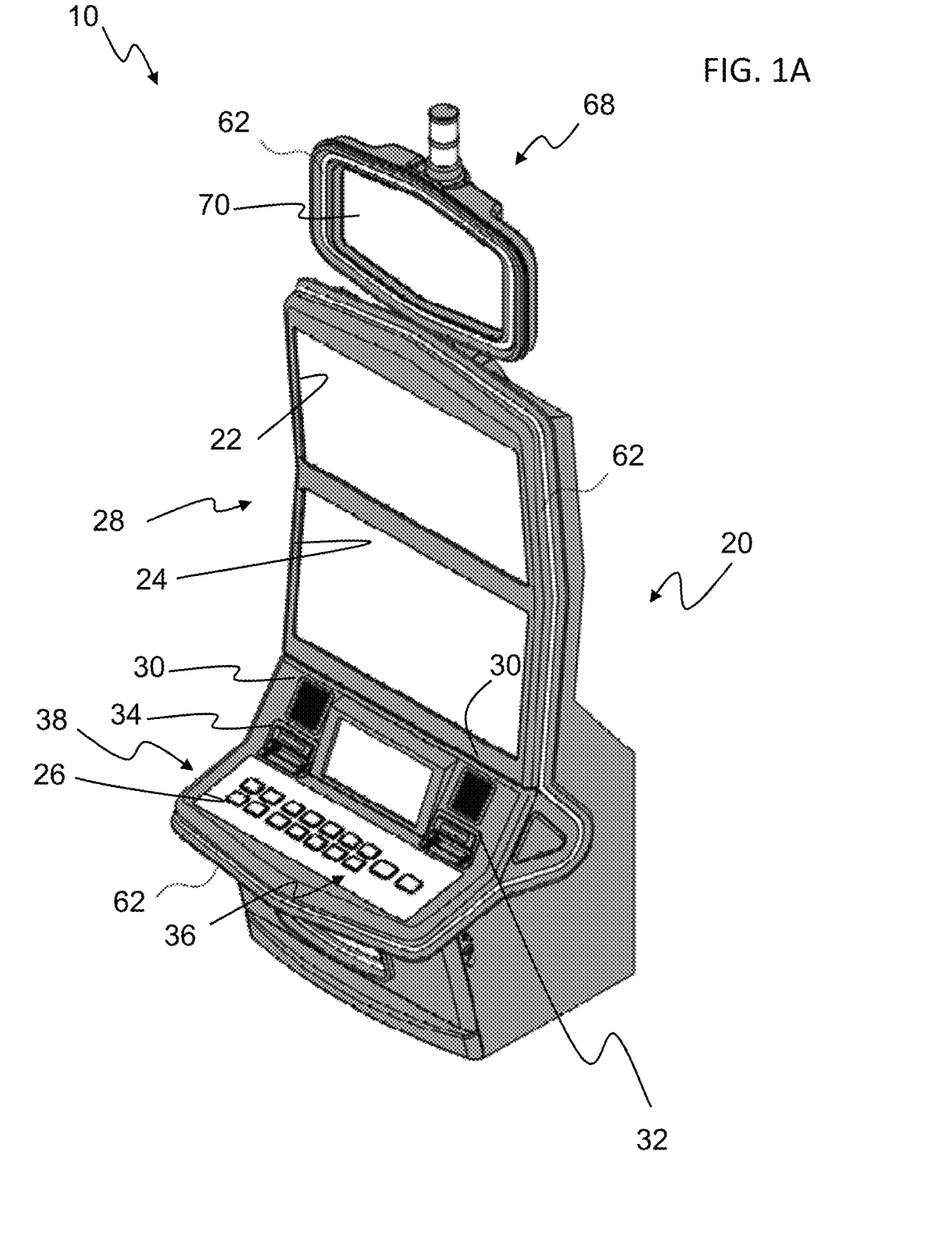
FIG. 1A is a perspective view of a gaming machine according to an embodiment of the present invention.
Figure 1B:
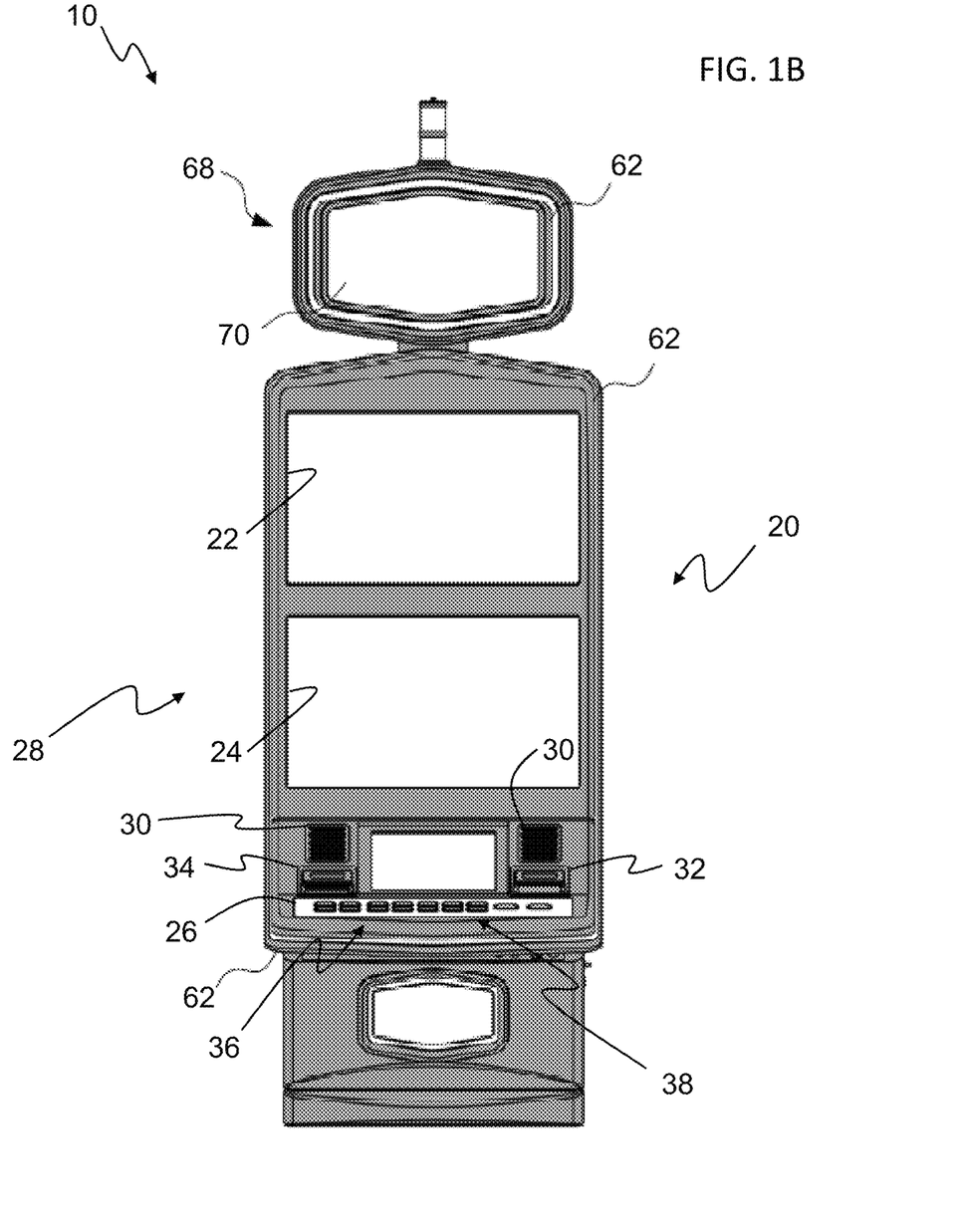
FIG. 1B is a front view of the gaming machine of FIG. 1A.

A series of gaming machines according to the present embodiment includes two or more exemplary gaming machines. FIG. 1A and FIG. 1B are a perspective view and a front view, respectively, of an exemplary gaming machine 10, according to the present embodiment. As shown in FIG. 1A, this gaming machine 10 provides a cabinet 20 providing an upper display 22, a lower display 24, a control panel 26 and may also house a player tracking or ranking unit 57 (see FIG. 2A). The cabinet 20 also houses a control unit 50 (see FIG. 2A) that controls each part (see below). The control unit 50 also implements a random number generator (RNG) that is used during operation of a game.

The upper display 22 and the lower display 24 may be flat panel display devices, such as both liquid crystal display devices and organic EL display devices and the like, and by controlling via each control unit 50, the game screen mentioned below functions as a display unit 28 provided to the player.

Speakers 30 are provided on the left and right of the cabinet 20, and by controlling via the control unit 50, sound is provided to the player. On the control panel 26, a bill/ticket identification unit 32, the printer unit 34, and an operation unit 36 are provided.

The player tracking unit may be housed on the center of the front surface of the third cabinet 20. The player tracking unit has a card reader that recognizes a player identification card, a display that presents data to the player, and a keypad that receives input by the player. This type of player tracking unit reads information recorded on the player identification card inserted by the player into the card reader, and displays the information and/or information acquired by communicating with the external system on the display, by cooperatively operating with the control unit 50 mentioned below or an external system. Further, input from the player is received by the keypad, the display of the display is changed according to the input, and communication with the external system is carried out as necessary.

The bill/ticket identification unit 32 is disposed on the control panel 26 in a state where the insertion opening that a bill or ticket is inserted into is exposed, an identification part that identifies a bill/ticket by various sensors on the inside of the insertion opening is provided, and a bill/ticket storage part is provided on the outgoing side of the identification part. The bill/ticket identification unit 32, receives and identifies bills and tickets (including vouchers and coupons) that are the game value as a game executing value, and notifies the control unit 50 mentioned below.

The printer unit 34 is disposed on the control panel 26 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer unit 34, under the control of the control unit 50 mentioned below, prints information on paper and outputs a ticket according to credit payout processing from the gaming machine 10. The output ticket can use the payout credit as game play by being inserted into the bill/ticket identification unit of another gaming machine, or can be exchanged for cash by a kiosk terminal inside of the casino or a casino cage.

The operation unit 36 receives the operation of the player. The operation unit 36 includes a group of buttons 38 that receives various instructions from the player on the gaming machine 10. The operation unit 36, for example, may include a spin button and a group of setting buttons. The spin button receives an instruction to start (start rotating the reel) a game. The group of setting buttons 38 includes a group of bet buttons, a group of line-designation buttons, a max bet button, and a payout button and the like. The group of bet buttons receives an instruction operation regarding the bet amount of credits (bet number) from the player. The group of line-designation buttons receives an instruction operation that designates a pay line subjected to a line judgment below from the player. The max bet button receives an instruction operation regarding the bet of the maximum amount of credits that can be bet at one time from the player. The payout button receives an instruction operation instructing a credit payout accumulated in the gaming machine 10.

Figure 2A:
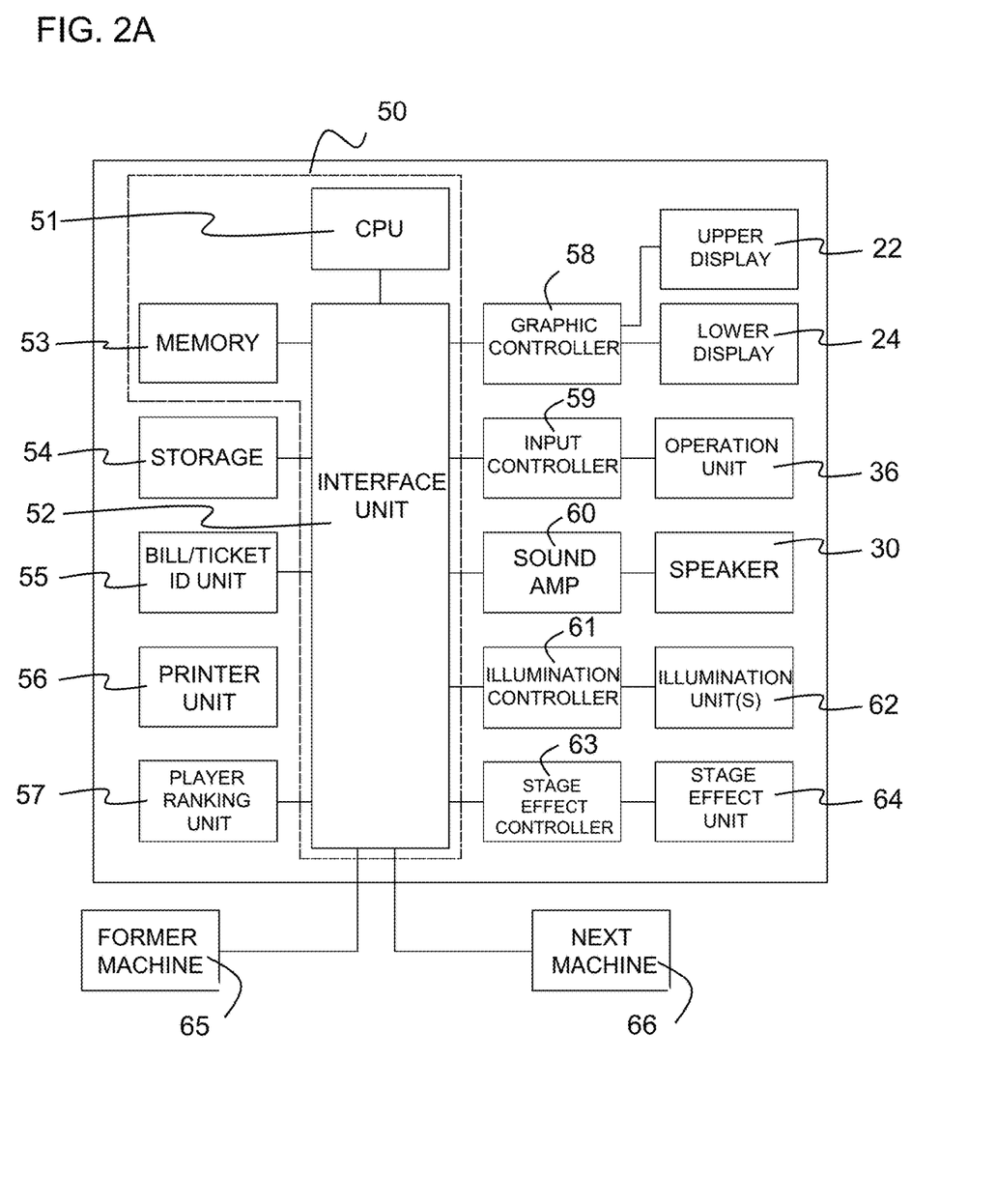
FIG. 2A is a functional block diagram of the hardware of the gaming machine in FIG. 1A-1B.

With reference to FIG. 2A, further on the inside of the cabinet 20, a control board equipped with a central processing unit 51 (abbreviated as CPU below) that configures the control unit 50, an interface unit (or part) 52, a memory 53 and a storage 54 and the like are incorporated. The control board is configured so that communication is possible through the interface unit 52 and each of the components equipped on the cabinet 20, controls the operation of each part by executing the program recorded in the memory 53 or the storage 54 of the CPU 51, and provides a game to the player.

FIG. 2A shows a functional block diagram of the hardware of gaming machine 10, according to the present embodiment. The gaming machine 10 provides the control unit 50. The control unit 50 is configured as the interface unit 52 including a chip set providing communication functions of the CPU 51, a memory bus connected to a CPU, various expanding buses, serial interfaces, USB interfaces, Ethernet (registered trademark) interfaces and the like, and a computer unit where the CPU 51 provides the addressable memory 53 and the storage 54 through the interface unit 52. The memory 53 can be configured to include RAM that is a volatile storage medium, ROM that is a nonvolatile storage medium, and EEPROM that is a rewritable nonvolatile storage medium. The storage 54 provides the control unit 50 as an external storage device function, can use reading devices such as a memory card that is a removable storage medium, and a magneto optical disk and the like, and can use hard disks.

On the interface unit 52, in addition to the CPU 51, the memory 53, and the storage 54, a bill/ticket identification unit 55, a printer unit 56, the player tracking unit 57, a graphic controller 58, an input controller 59, and a sound controller 60 are connected. That is, the control unit 50 is connected to the operation unit 36 through the input controller 59, and connected to the upper display 22 and/or the lower display 24 through the graphic controller 58.

Further, when illumination that provides decorative lighting to the gaming machine 10 is provided, the illumination is controlled under the control of the control unit 50 on the interface unit 52, and an illumination controller 61 that provides a decorative lighting effect by way of one or more illumination unit 62 may be connected. One illumination unit 62 may be provided at a peripheral surface of the cabinet 20 so as to form a line surrounding the upper display 22, the lower display 24, and the control panel 26. Additionally or alternatively, another illumination unit 62 may be provided at a topper unit 68 on the outer periphery of a topper display 70. The illumination unit 62 may have, for example, (1) semi-transparent white acrylic resin/plastic parts exposed on the cabinet 20, and (2) one or more RGB LED modules behind the acrylic resin/plastic parts (not shown). The control unit 26 may control turning illumination on/off, color balance of the RGB LED modules, and total brightness of each RGB LED modules via illumination controller 62 to perform a visual effect (e.g., illumination).

Moreover, when a stage effect is provided within the gaming machine 10, the stage effect is controlled under the control of the control unit 50 on the interface unit 52, and a stage effect controller 63 that provides a stage effect by way of a stage effect unit 64 may be connected. The stage effect controller 63 may control other functional blocks (e.g., upper display 22, lower display 24, sound controller 60 with speakers 30 and/or illumination controller 61 with illumination unit 62) to perform a predetermined stage effect.

The control unit 50, which includes memory 53 and storage 54, controls each part by executing a program stored in the memory 53 and the storage 54, and provides a game to the player. Here, for example, the memory 53 and storage 54 may be configured to store a program and data of an operating system and subsystem that provide the basic functions of the control unit 50 to the EEPROM of the memory 53, and stores a program and data of an application that provides a game to the storage 54. According to such a configuration, it can be easy to change or update a game by replacing the storage 54. Further, the control unit 50 may be a multiprocessor configuration that has a plurality of CPUs.

Each block connected to the control unit 50 is described below. The bill/ticket identification unit 55 corresponds to the bill/ticket identification unit 32, receives bills or tickets in the insertion opening, and notifies the control unit 50 of identifying information corresponding to the assortment of bills or the payout processing of credits. The bill/ticket identification unit 55 notifies the information to the control unit 50, and the control unit 50 increases the usable credit amount inside of the game according to the notified content. The printer unit 56 corresponds to the printer unit 34, and under the control of the control unit 50 that receives an operation of the payout button of the group of setting buttons 38, information corresponding to the credit payout processing from the gaming machine 10 is printed and output on a printed ticket.

The player ranking (or tracking unit) unit 57 cooperatively operates with the control unit 50, and sends and receives information and the like of the player from the casino management system. The graphic controller 58 controls the upper display 22 and the lower display 24, under the control of the control unit 50, and displays a display image that includes various graphic data. The sound controller 60 drives the speakers 30 under the control of the control unit 50, and provides various sounds such as an announcement, sound effects, BGM and the like. Further, the interface unit 52 has various communication interfaces for communicating with the exterior of the gaming machine 10, including a former gaming machine 65 and a next gaming machine 66 in the series of gaming machines of the present embodiment.

Figure 2B:
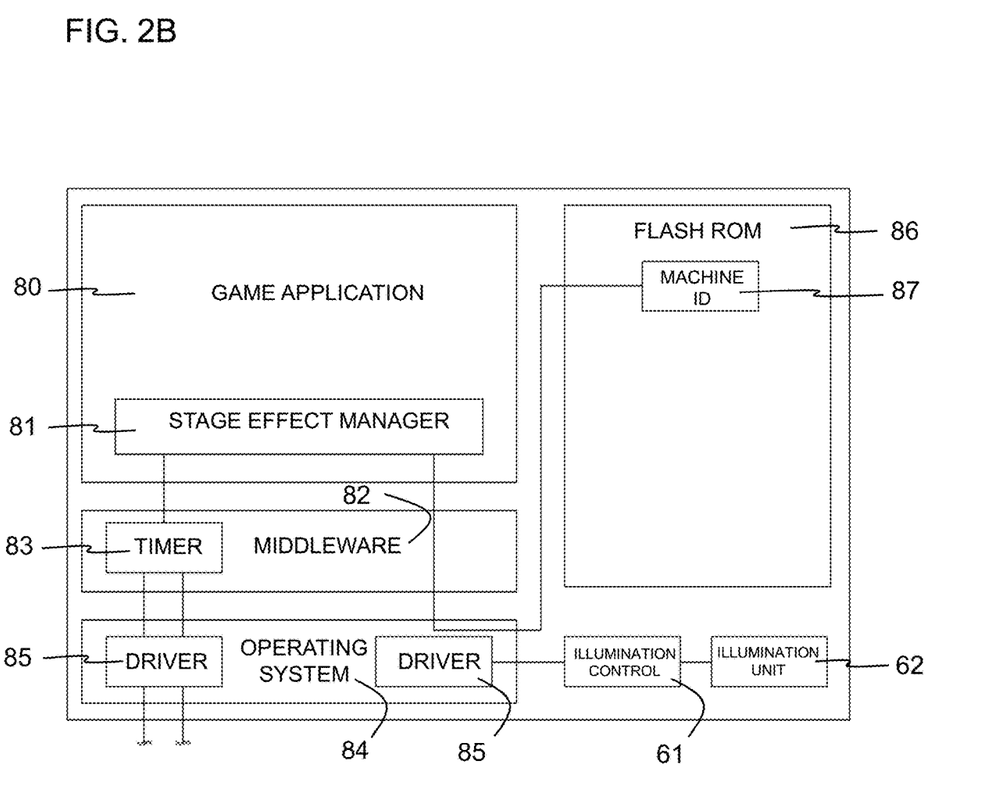
FIG. 2B is a functional block diagram of the software of the gaming machine in FIG. 1A-1B.

FIG. 2B shows a functional block diagram of the software of gaming machine 10, according to the present embodiment. Each exemplary gaming machine 10 runs a game application 80, which includes a stage effect manager 81. The stage effect manager 81 of the game application 80 may be a software implementation of the stage effect controller 63. Middleware 82 connects game application 80 to an operating system 84. Middleware 82 includes a common timer 83, which shows the same time across each of the serially connected gaming machines 10.

Figure 3A:
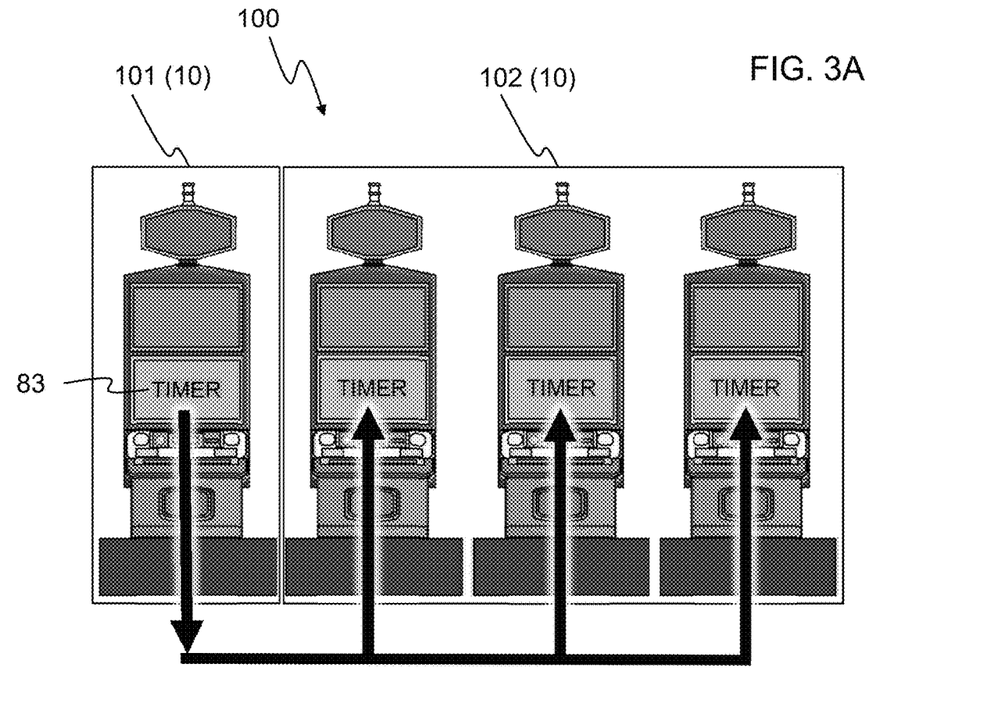
FIG. 3A illustrates a reset signal path through a series of gaming machines.

Referring now to FIG. 3A, a reset signal path through a series of gaming machines is illustrated. To facilitate operation of the common timer 83, the first gaming machine in a series of gaming machines may be designated as the "master" gaming machine and each of the remaining gaming machines in the series may be designated as a "slave" gaming machine. Referring now to FIG. 3A, a series of gaming machines 100 includes master gaming machine 101. Master gaming machine 101 sends a reset signal that resets the common timer 83 in each of the slave gaming machines 102. The arrows illustrate the reset signal path through the series of gaming machines 100. By this common timer 83, each of the series of gaming machines 100 can perform associated stage effects and associated stage effects transition(s) based on common present time information. In a preferred embodiment of the present invention, a series of 256 individual gaming machines 10 may be connected, where gaming machine 0 is designated as the master gaming machine 101, and gaming machines 1-255 are designated as slave gaming machines 102.

Figure 3B:
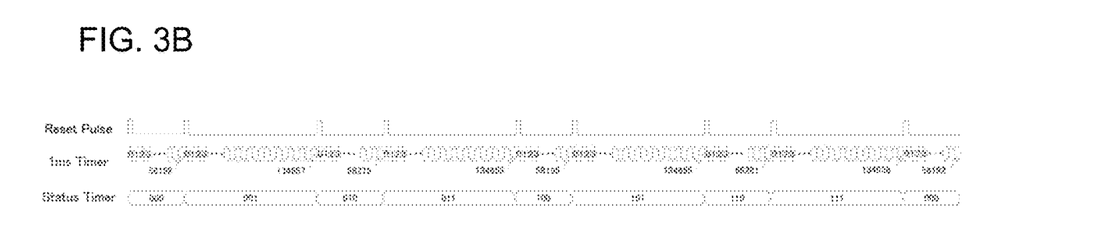
FIG. 3B illustrates the relationship between a delay timer and a status timer.

In some embodiments of the present invention, the common timer 83 may consist of two types of timers: a delay timer (e.g., a 1-millisecond delay timer) and a status timer. The delay timer is required for implementation of the association of a stage effect amongst a series of gaming machines. The delay timer may comprise a 21-bit counter with millisecond increments (e.g., one millisecond increments). The status timer is not required for the implementation of the stage effect association feature. The status timer includes a 3-bit counter to increment every reset signal generated by the master gaming machine 101 for a predetermined period of time. The delay timer is cleared by after the status timer reaches a predetermined value. When the status timer reaches the predetermined value, a "1" is added to the timer, which in turn clears the value of the status timer. For example, when the status timer reaches '111', +1 is added and the value returns to '000'. An exemplary status timer cycle is shown as follows, with exemplary values corresponding to predetermined time periods (in seconds): 000 [58.192 s]→001 [134.657 s]→010 [66.278 s]→011 [134.653 s]→100 [58.195 s]→101 [134.655 s]→110 [66.281 s]→111 [134.656 s], where the entire cycle is 13 minutes and 7.571 seconds. Use of this cycle prevents time errors from accumulating within the software process. FIG. 3B illustrates the relationship between the delaytimer and the status timer.

When a slave gaming machine 102 is switched off, the predetermined period of time of the status timer may lead a maximum of 6 seconds and reconstruction of the connection between master and slave may occur. The delay timer may gain about 5 seconds for reconstructing the connection. Care should be taken to avoid a disruption in the desired associated stage effect being performed. An idle period, where no stage effect is performed, may be programmed to be initiated during the turning on and off of slave gaming machines 102 or when one stage effect is being switched for another.

Referring back to FIG. 2B, the operating system 84 further includes drivers 85, which provide software interfaces to illumination controller 61 that provides a decorative lighting effect by way of an illumination unit 62.

The gaming machine software further includes flash read-only memory (ROM) 86 for storing a machine ID 87. In an embodiment of the present invention, the machine ID 87 includes information that may be assigned to each gaming machine 10 in a series of gaming machines 100. Illumination controller 61 is configured to cause the illumination unit 62 to perform a predetermined stage effect based on timer information from common timer 83 and machine ID 87. Timer information may include time elapsed by the status timer and/or time elapsed by the delay timer. The machine ID 87 provides information about the location of a gaming machine 10 relative to the master gaming machine 101.

A machine ID 87 may be updated when the value of status timer is either "100" or "110", as described above. Examples of updating the machine ID 87 are shown below, where "STV" is an abbreviation for "Status Timer Value"):

<Normal Operation>

| | |
|---|---|
| Turn on all machines | ID0->ID0->ID0->ID0->ID0->ID0->ID0->ID0-> ... |
| STV: 000-011 | ID0->ID0->ID0->ID0->ID0->ID0->ID0->ID0-> ... |
| STV: 100 | ID0->ID1->ID2->ID3->ID4->ID5->ID6->ID7-> ... |

<Turn Off a Gaming Machine>

| | |
|---|---|
| Status Timer: Optional | ID0->ID1->ID2->ID3->ID4->ID5->ID6->ID7-> ... |
| Turn off 4$^{th}$ machine | ID0->ID1->ID2->****->ID0->ID5->ID6->ID7-> ... |

-continued

| | |
|---|---|
| STV: Any except 100, 110 | ID0->ID1->ID2->****->ID0->ID5->ID6->ID7-> ... |
| STV: 100 or 110 | ID0->ID1->ID2->****->ID0->ID1->ID2->ID3-> ... |

<Turn on a Gaming Machine>

| | |
|---|---|
| Status Timer: Optional | ID0->ID1->ID2->****->ID0->ID1->ID2->ID3-> ... |
| Turn on the 4$^{th}$ machine | ID0->ID1->ID2->ID0->ID0->ID1->ID2->ID3-> ... |
| STV: Any except 100, 110 | ID0->ID1->ID2->ID0->ID0->ID1->ID2->ID3-> ... |
| STV: 100 or 110 | ID0->ID1->ID2->ID3->ID4->ID5->ID6->ID7-> ... |

Although it is possible to associate a stage effects among the series of gaming machines 100 by using common timer 83 alone, in some instances it may be desirable to delay stage effects between each gaming machine 10 among the series of gaming machines 100. For example, it may be desirable to perform an associated stage effect in a pattern such that the illumination flows from the left-most gaming machine 10 to the right-most gaming machine 10 in the series of gaming machines 100.

When sequential machine IDs 87 are assigned in a common series of gaming machines 100, each gaming machine 10 can identify its position within the series of gaming machines 100. Therefore, the series of gaming machines 100 performs more complex stage effects, such as synchronized effects based on a sequential ordering, or alternate or special stage effects based on specific positions of each gaming machine 10.

Figure 4A:
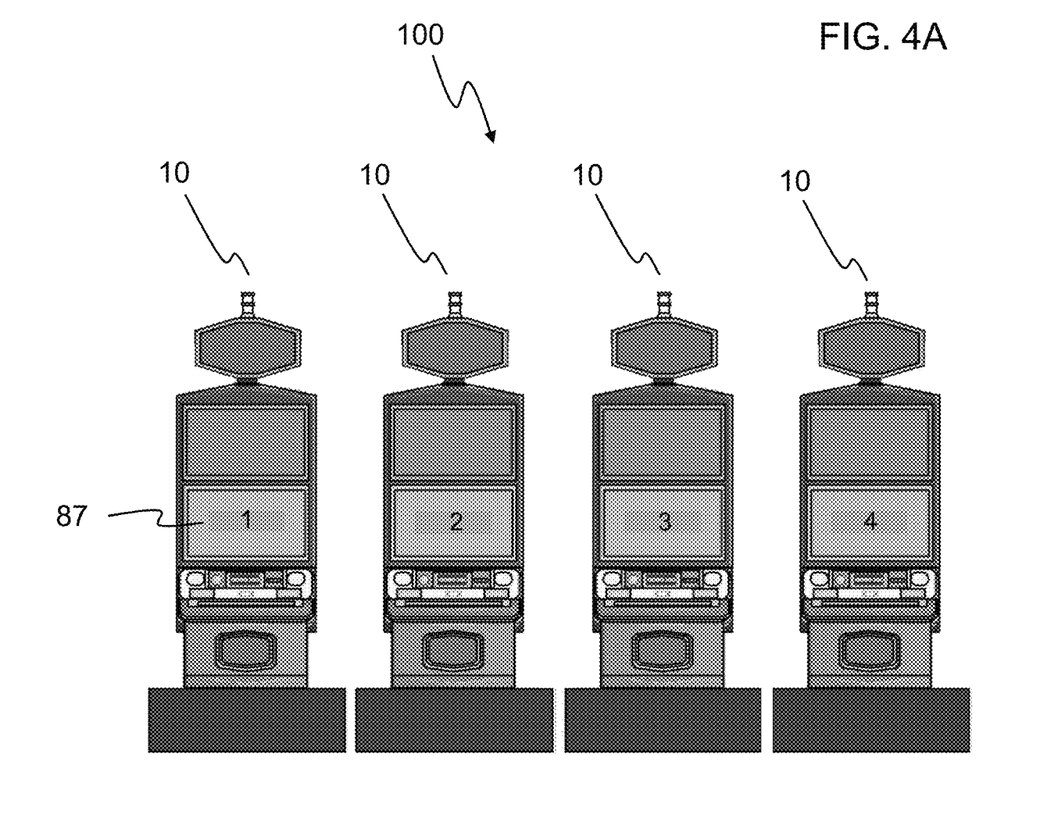
FIGS. 4A-4E illustrate operation of a sequential stage effect across a series of gaming machines.
Figure 4B:
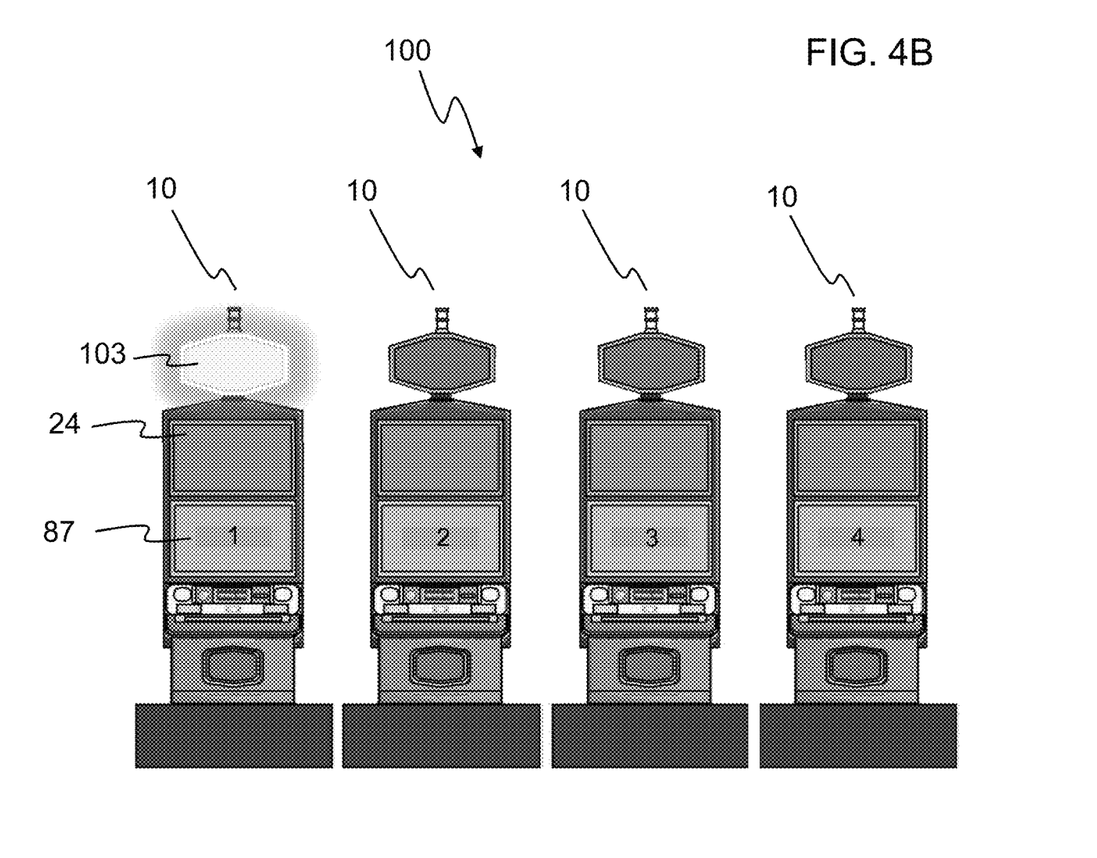
Figure 4C:
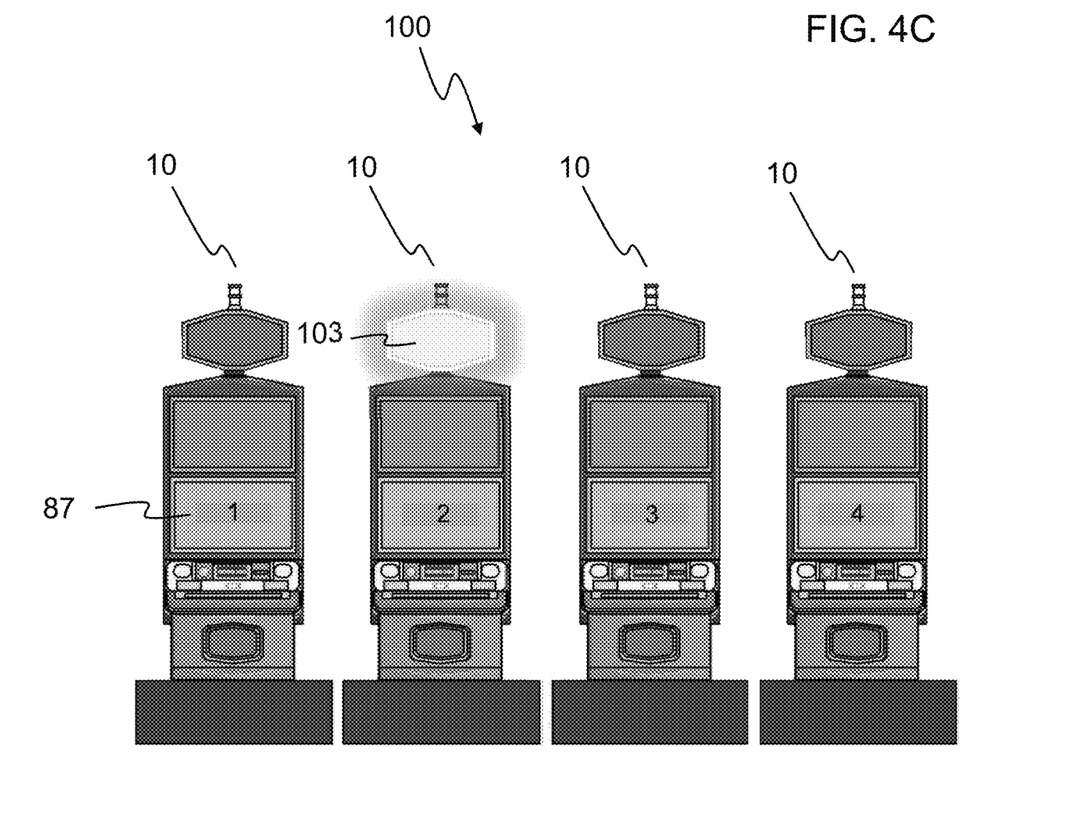
Figure 4D:
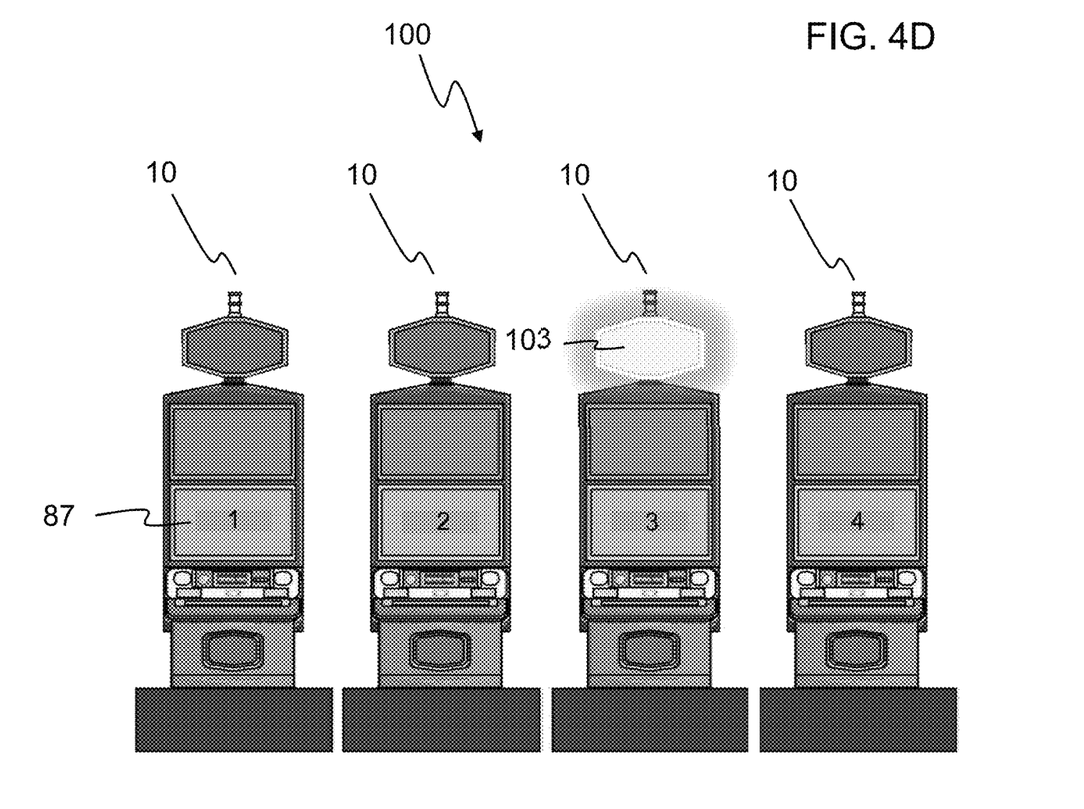
Figure 4E:
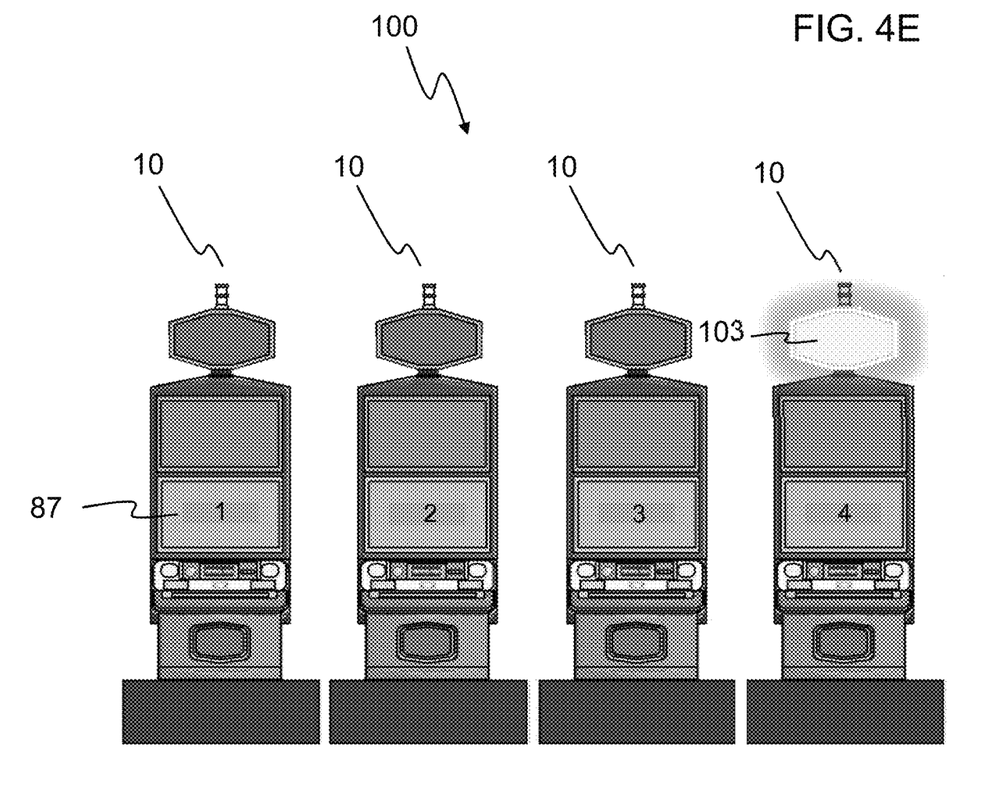

Referring now to FIGS. 4A-4E, the series of gaming machines 100 may perform a sequential stage effect by delaying illumination based on machine ID 87. Each of four gaming machines 10 in a series of gaming machines 100 may be given machine IDs 87: "1", "2", "3", and "4" (FIG. 4A). The sequential stage effect may be ordered as 1-2-3-4, such that the gaming machine 10 that is assigned a machine ID of 87 "1" illuminates first in the series (FIG. 4B), the gaming machine 10 that is assigned a machine ID of 87 "2" illuminates second in the series (FIG. 4C), the gaming machine 10 that is assigned a machine ID of 87 "3" illuminates third in the series (FIG. 4D), and gaming machine 10 that is assigned a machine ID 87 of "4" is illuminated fourth in the series (FIG. 4E), where the illumination effect is illustrated by design 103. FIGS. 4A-4D illustrate only one example of a possible sequential stage effect. It will be understood that any ordering may be chosen, i.e., 4-3-2-1, 1-2-4-3, 1-3-4-2, and the like. The delayed illumination is a function of setting the ordering pattern and the predetermined delay interval in the game application 80.

Moreover, any gaming machine 10 can synchronously display illumination regardless of machine ID 87, so as to perform synchronous stage effects in the series of gaming machines 100. This is achieved by setting the machine ID 87 and "0" as the predetermined delay interval in the game application 80.

Figure 5A:
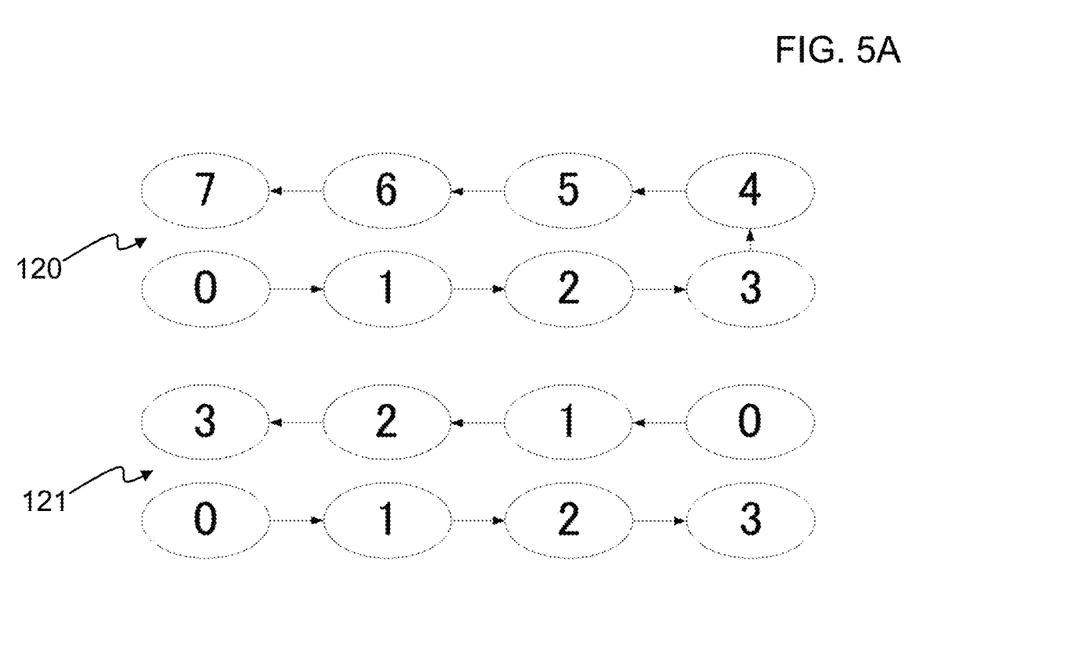
FIG. 5A is a diagrammatic illustration of a first exemplary game machine layout.
Figure 5B:
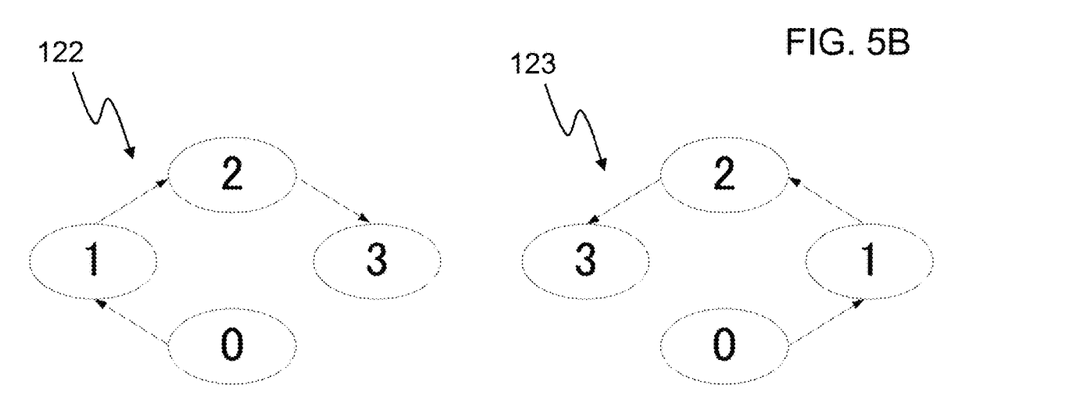
FIG. 5B is a diagrammatic illustration of a second exemplary game machine layout.

A series of gaming machines 100 may be placed on a gaming floor in any configuration that allows for operation of the associated stage effect. For example, FIG. 5A illustrates a machine layout 120, where two back-to-back rows of four gaming machines 10 (numbered with machine IDs 0-7) are connected at one end by the gaming machines 10 associated with machine IDs "3" and "4", and a machine layout 121, having two back-to-back rows of four gaming machines 10 (numbered with machine IDs 0-3 and 0-3), where the two rows are not connected. In an alternate embodiment, as shown in FIG. 5B, machine layouts 122 and 123 each include gaming machines (numbered with machine IDs 0-3) arranged in a carousel formation.

Figure 6:
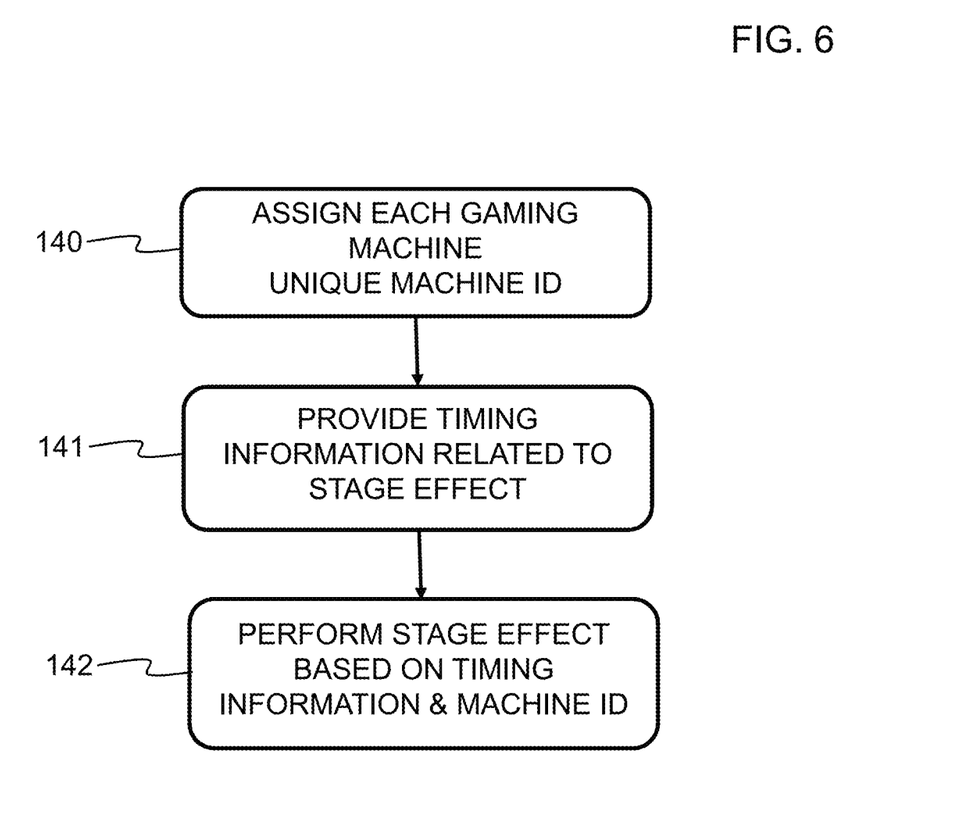
FIG. 6 is a flow diagram illustrating a method for associating a stage effect among the series of gaming machines.

Referring now to FIG. 6, a method for associating a stage effect among the series of operably interconnected gaming machines is illustrated. At a first step 140, each of the plurality of gaming machines is assigned a unique machine identification code. This step may be performed through setting operation of a casino attendant or retrieval of stored machine identification code from memory or stage of the gaming machine. At a second step 141, a common timer of each of the plurality of gaming machines provides timing information related to the display of a predetermined stage effect by a display unit of each of the plurality of gaming machines. At a third step 142, a control unit of each of the plurality of gaming machines performs the predetermined stage effect based on the timing information and the machine identification code.

Exemplary embodiments of a gaming machine, a system comprising a series of gaming machines, and a method to associate a stage effect among the series of gaming machines are not limited to the specific embodiments described herein, but rather, components of the gaming device and/or system and/or steps of the method may be utilized independently and separately from other components and/or steps described herein. For example, the exemplary gaming machine may also be used in combination with other gaming systems and methods, and is not limited to practice with only the gaming machine as described herein. Rather, an exemplary embodiment can be implemented and utilized in connection with many other gaming system applications. For instance, the present invention is applicable to a gaming system which is a combination of a community gaming system and individual gaming devices.

A controller, computing device, or computer, such as described herein, includes at least one or more processors or processing units and a system memory. The controller typically also includes at least some form of computer-readable media. By way of example and not limitation, computer-readable media may include computer storage media and communication media. Computer storage media may include volatile and nonvolatile, removable and non-removable media implemented in any method or technology that enables storage of information, such as computer-readable instructions, data structures, program modules, or other data. Communication media typically embody computer-readable instructions, data structures, program modules, or other data in a modulated data signal, such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer-readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced other than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A system comprising:
a plurality of gaming machines operably interconnected and linked serially, wherein one of the plurality of gaming machines comprises a master gaming machine and a remainder of the plurality of gaming machines comprises slave machines operably interconnected, each of the plurality of gaming machines assigned a unique machine identification code from a predefined sequence of machine identification codes indicating a position of each gaming machine within a common series of gaming machines, each unique machine identification code indicates a relative position of a gaming machine from the master gaming machine within the common series and including:

a stage effect controller configured to perform a predetermined stage effect,
a common timer comprising a delay timer including millisecond increment, the common timer providing timing information related to the performance of the predetermined stage effect to each of the plurality of gaming machines, the timing information including time elapsed by the delay timer, and
a control unit operably coupled to the stage effect controller and being configured to control the stage effect controller, the stage effect controller being configured to perform the predetermined stage effect based on the timing information and the machine identification code, wherein the stage effect controller of the master gaming machine sends a reset signal to each slave gaming machines at predefined time intervals that resets the delay timer of each slave gaming machine to synchronize the common timer in each of the slave machines, wherein a path of the reset signal is through the slave machines in series such that each of the slave machines performs the predetermined stage effect based on the timing information.

2. The system of claim 1, wherein the common timer further comprises a status timer.

3. The system of claim 2, wherein the status timer increments a plurality of reset signals generated by the master gaming machine for a predetermined period of time.

4. The system of claim 1, wherein the predetermined stage effect is an illumination effect.

5. The system of claim 1, wherein the predetermined stage effect is a video graphic.

6. The system of claim 1, wherein the predetermined stage effect is a sound.

7. The system of claim 1, wherein the predetermined stage effect is a mechanical reel spin.

8. The system of claim 1, wherein the predetermined stage effect is a synchronized stage effect operation.

9. A method to associate a stage effect among a plurality of operably interconnected gaming machines linked serially, the method comprising:
assigning to each of the plurality of gaming machines a unique machine identification code from a predefined sequence of machine identification codes indicating a position of each gaming machine within a common series of gaming machines, each unique machine identification code indicates a relative position of a gaming machine from the master gaming machine within the common series, wherein one of the plurality of gaming machines comprises a master gaming machine and a remainder of the plurality of gaming machines comprises slave machines operably interconnected;
providing, by a common timer comprising a delay timer including millisecond increment of each of the plurality of gaming machines, timing information related to a performance of a predetermined stage effect by a stage effect controller of each of the plurality of gaming machines, the timing information including time elapsed by the delay timer;
controlling, by a control unit of each of the plurality of gaming machines, the stage effect controller, the control unit being operably coupled to the stage effect controller; and
performing, by the stage effect controller, the predetermined stage effect based on the timing information and the machine identification code, sending, by the stage effect controller of the master gaming machine, a reset signal to each slave gaming machines at predefined time intervals that resets the delay timer of each slave gaming machine to synchronize the common timer in each of the slave machines, wherein a path of the reset signal is through the slave machines in series such that each of the slave machines performs the predetermined stage effect based on the timing information.

10. The method of claim 9, wherein the common timer further comprises a status timer.

11. The method of claim 10, wherein the status timer increments a plurality of reset signals generated by the master gaming machine for a predetermined period of time.

12. The method of claim 9, wherein the predetermined stage effect is an illumination effect.

13. The method of claim 9, wherein the predetermined stage effect is a video graphic.

14. The method of claim 9, wherein the predetermined stage effect is a sound.

15. The method of claim 9, wherein the predetermined stage effect is a mechanical reel spin.

16. The method of claim 9, wherein the predetermined stage effect is a synchronized stage effect operation.

17. The system of claim 1, wherein the delay timer has a predetermined delay interval greater than zero to perform sequential stage effects in the series of the slave machines.

18. The system of claim 1, wherein the delay timer has a predetermined delay interval as zero to perform synchronized stage effects in the series of the slave machines.

19. The method of claim 9, wherein the delay timer has a predetermined delay interval greater than zero to perform sequential stage effects in the series of the slave machines.

20. The method of claim 9, wherein the delay timer has a predetermined delay interval as zero to perform synchronized stage effects in the series of the slave machines.

* * * * *

UNITED STATES PATENT AND TRADEMARK OFFICE
CERTIFICATE OF CORRECTION

PATENT NO. : 10,600,280 B2  
APPLICATION NO. : 15/178191  
DATED : March 24, 2020  
INVENTOR(S) : Takashi Akita Page 1 of 1

It is certified that error appears in the above-identified patent and that said Letters Patent is hereby corrected as shown below:

On the Title Page

At item (72) Inventor: Takashi Akita, please delete "Zama (JP)" and replace with -- Zama-shi (JP) --.

Signed and Sealed this  
Eighteenth Day of August, 2020

Andrei Iancu  
*Director of the United States Patent and Trademark Office*